(12) United States Patent
Määttä et al.

(10) Patent No.: US 9,199,759 B2
(45) Date of Patent: Dec. 1, 2015

(54) METHOD FOR FORMING A PACKAGE

(75) Inventors: Päivi Määttä, Lappila (FI); Olavi Pirttiniemi, Järvelä (FI); Johanna Lindén, Lappeenranta (FI)

(73) Assignee: Delight Packaging Oy, Imatra (FI)

( * ) Notice: Subject to any disclaimer, the term of this patent is extended or adjusted under 35 U.S.C. 154(b) by 0 days.

(21) Appl. No.: 13/996,204

(22) PCT Filed: Feb. 21, 2012

(86) PCT No.: PCT/IB2012/050785
§ 371 (c)(1),
(2), (4) Date: Jun. 25, 2013

(87) PCT Pub. No.: WO2012/114270
PCT Pub. Date: Aug. 30, 2012

(65) Prior Publication Data
US 2013/0341388 A1 Dec. 26, 2013

(30) Foreign Application Priority Data

Feb. 23, 2011 (SE) ..................... 1150153

(51) Int. Cl.
| | | |
|---|---|---|
| B29C 45/14 | (2006.01) |
| B65D 1/24 | (2006.01) |
| B65D 1/34 | (2006.01) |
| B29D 22/00 | (2006.01) |
| B65D 1/40 | (2006.01) |

(Continued)

(52) U.S. Cl.
CPC . *B65D 1/24* (2013.01); *B29C 45/14* (2013.01); *B29C 45/14336* (2013.01); *B29D 22/003* (2013.01); *B31B 1/00* (2013.01); *B65D 1/34* (2013.01); *B65D 1/40* (2013.01); *B29K 2711/12* (2013.01); *B31B 2201/223* (2013.01); *B31B 2201/621* (2013.01)

(58) Field of Classification Search
None
See application file for complete search history.

(56) References Cited

U.S. PATENT DOCUMENTS

| | | | |
|---|---|---|---|
| 3,154,617 A | * | 10/1964 | Schenk et al. ............... 264/266 |
| 3,436,008 A | | 4/1969 | Santangelo |
| 3,511,902 A | | 5/1970 | Santangelo |

(Continued)

FOREIGN PATENT DOCUMENTS

| | | |
|---|---|---|
| DE | 8210074 | 7/1982 |
| EP | 1289856 | 3/2003 |

(Continued)

*Primary Examiner* — Edmund Lee
(74) *Attorney, Agent, or Firm* — Greer, Burns & Crain, Ltd.

(57) ABSTRACT

The disclosure concerns a package (30) comprising a cardboard blank (31), the cardboard blank (31) being shaped as a container with a bottom (31a) and one or more cardboard sidewalls (31b) extending upwardly from the bottom (31a), the package (30) further comprising a molded rim (32) being attached to said one or more cardboard sidewalls (31b), along an interface (I) formed of an upper portion of said one or more cardboard sidewalls (31b) and a lower portion of said molded rim (32), and extending along at least a part of an upper edge of said one or more cardboard sidewalls (31b), characterised in that the rim (32) is extending essentially upright upwardly from said one or more cardboard sidewalls (31b) thereby providing the package (30) with a molded upper sidewall portion. The disclosure also concerns a method and a molding tool.

12 Claims, 7 Drawing Sheets

(51) Int. Cl.
  *B31B 1/00* (2006.01)
  *B29K 711/12* (2006.01)

(56) References Cited

U.S. PATENT DOCUMENTS

| | | | | |
|---|---|---|---|---|
| 3,931,385 | A | * | 1/1976 | Sutch .......................... 264/154 |
| 4,108,587 | A | * | 8/1978 | Rumball ....................... 425/112 |
| 4,149,838 | A | * | 4/1979 | Sutch .......................... 425/112 |
| 5,425,972 | A | | 6/1995 | Calvert |
| 8,549,721 | B2 | * | 10/2013 | Vesanto et al. ................ 29/458 |
| 2004/0262322 | A1 | | 12/2004 | Middleton |
| 2010/0244317 | A1 | * | 9/2010 | Andersson ................ 264/271.1 |
| 2010/0264203 | A1 | * | 10/2010 | Vesanto et al. ............. 229/406 |

FOREIGN PATENT DOCUMENTS

| | | | |
|---|---|---|---|
| EP | 1616800 | | 1/2006 |
| GB | 2171048 | * | 8/1986 |
| JP | 08207924 | * | 8/1996 |
| JP | 8282646 | | 10/1996 |
| JP | 9142434 | | 6/1997 |
| JP | 10119951 | | 5/1998 |
| JP | 10296788 | | 11/1998 |
| JP | 11035028 | | 2/1999 |
| WO | 0021854 | | 4/2000 |
| WO | 03033258 | | 4/2003 |
| WO | 2009074721 | | 6/2009 |

\* cited by examiner

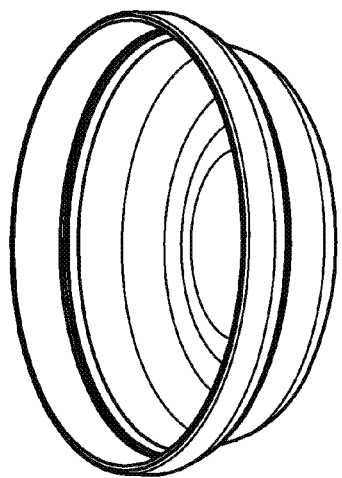
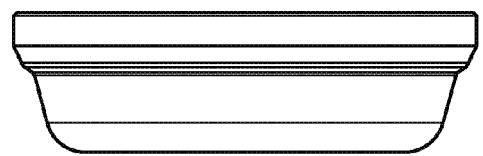
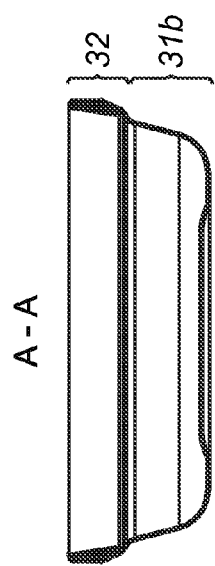
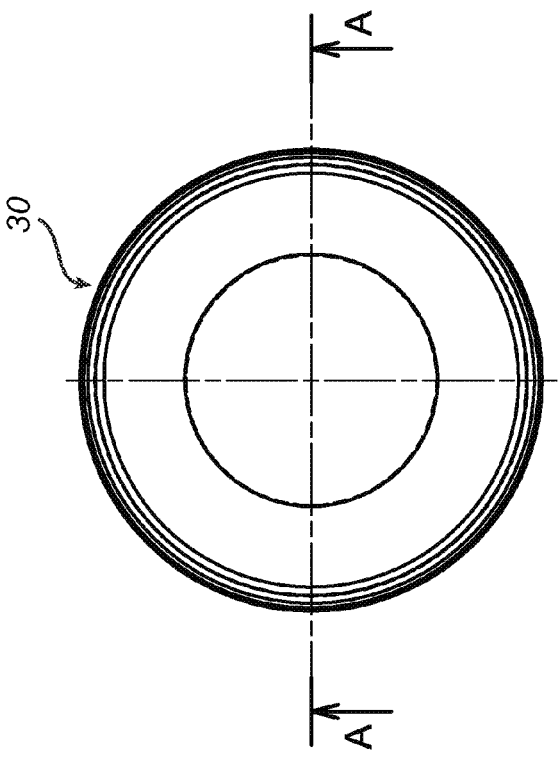

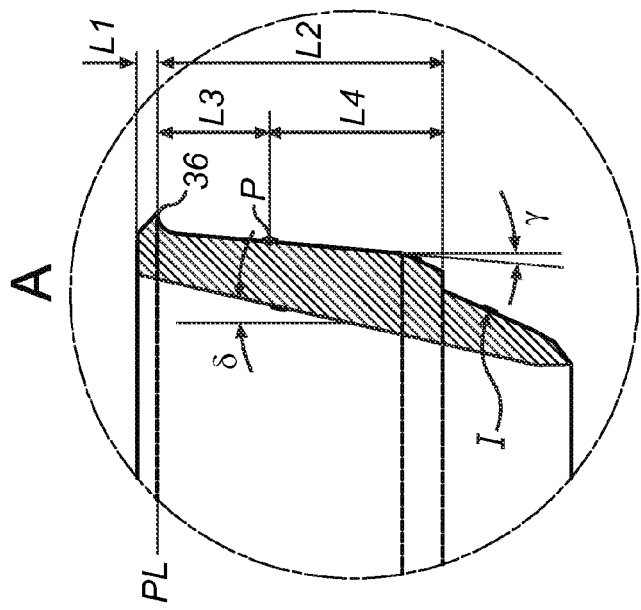
*Fig. 5d*
*Fig. 5c*
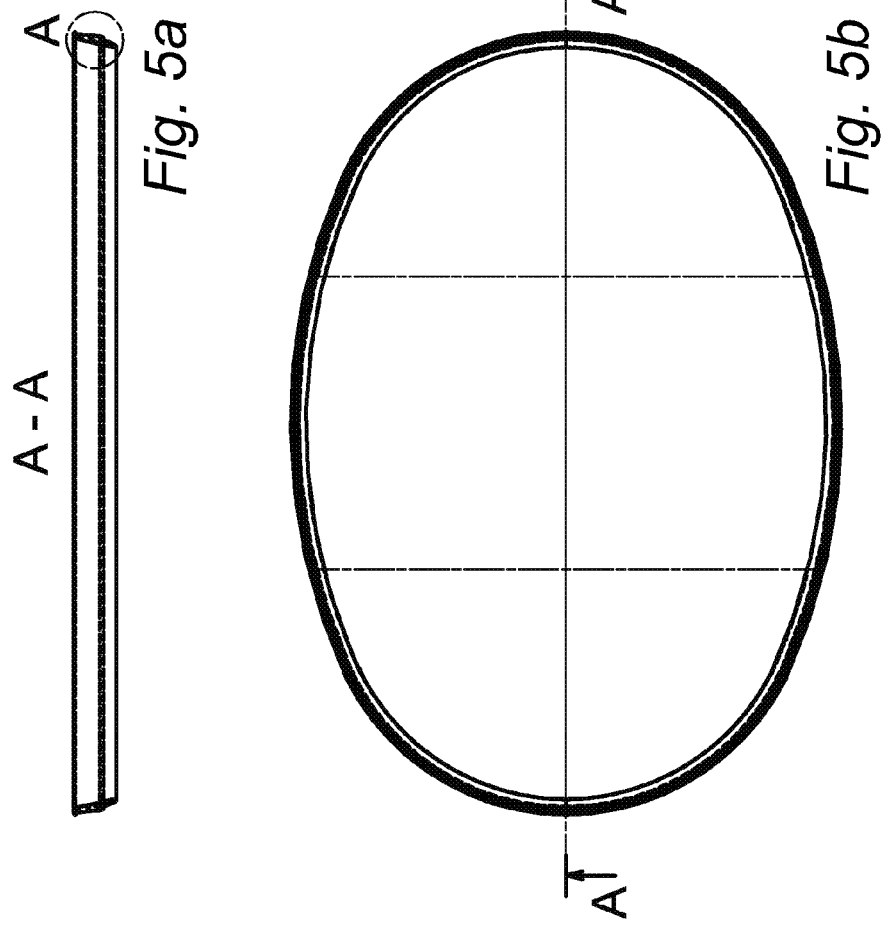
*Fig. 5a*
*Fig. 5b*

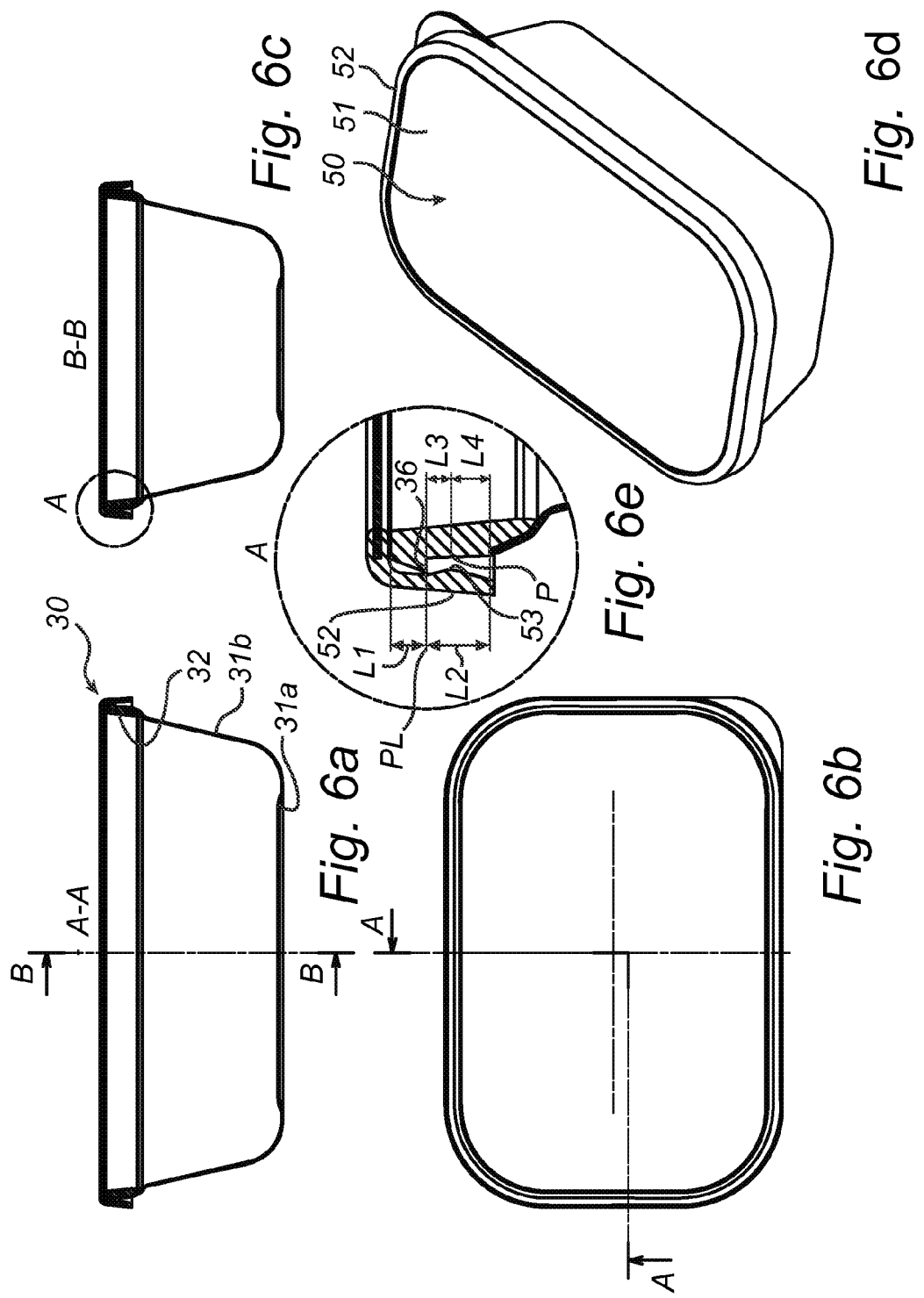

METHOD FOR FORMING A PACKAGE

This application is a U.S. National Phase under 35 U.S.C. §371 of International Application No. PCT/IB2012/050785, filed Feb. 21, 2012, which claims priority under 35 U.S.C. §§119 and 365 to Swedish Application No. 1150153-3, filed Feb. 23, 2011.

TECHNICAL FIELD OF THE INVENTION

The invention relates to a package comprising a cardboard blank, the cardboard blank being shaped as a container with a bottom and one or more cardboard sidewalls extending upwardly from the bottom, the package further comprising a moulded rim being attached to said one or more cardboard sidewalls, along an interface formed of an upper portion of said one or more cardboard sidewalls and a lower portion of said moulded rim, and extending along at least a part of an upper edge of said one or more cardboard sidewalls. The invention also relates to a method for forming a package and a moulding tool for use in forming a package.

BACKGROUND TECHNOLOGY

A package of this basic kind is e.g. disclosed in WO2009/074721A1. This disclosure relates to a method for forming a package and a package with the shape of a container being formed of a cardboard blank. The package is provided with a bottom and sidewalls extending upwards from the bottom. At the end stage of compression moulding, a rim of moulding material extending sideways is moulded to the upper part of the sidewalls when the mould is kept closed in such a way that a mould cavity corresponding to the rim is formed by moving a counter surface inside the mould backwards from a surface opposite to it, after which the moulding material is introduced into the mould cavity. This provides the package with a horizontally extending flange which may be used to glue or heat seal a plastic or paper lid onto the upper surface of the horizontally extending flange.

The package of WO2009/074721A1 is an improvement over the basic kind of tray-shaped packages that have been used for relatively long time for, amongst others, pre-cooked ready-to-heat meals.

A similar kind of package is also disclosed in US2004/262322A1. This document discloses e.g. a method in which the rim of a tray-like package is moulded of a plastic material separately. It discloses a design, in which the blanks are joined together at their edges with moulded plastic material, after which the plastic rim is moulded to the upper edges of said sidewalls, to form a flange extending outwardly from them and encircling the package.

The most common so-called tray packages for keeping food is often formed from a cardboard blank shaped with a horizontal rim or flange extending from the upper end of the sidewalls and encircling the package. The packages are often closed, or even hermetically sealed, with a lid formed of a sheet of plastic or paper. The upper surface of the cardboard blank or the lower surface of the lid normally comprises a suitable coating, by means of which the lid can be attached to the package securely. For example, it is common to use heat-sealable plastic materials as coatings on the cardboard blank or on the lid, or to form the lid of a heat-sealable plastic material, to attach the lid to the package. Examples of food packages and package materials used therein are mentioned e.g. in documents WO 2003/033258, EP 1 289 856, WO 2000/21854, and U.S. Pat. No. 5,425,972.

The above mentioned WO2009/074721A1 was amongst others developed to take into account that sometimes there is a need to provide the edge flange with a material that is suitable for fixing the lid but is not necessarily required in the middle part, that is, inside the package, or that is even unsuitable as a material inside the package. Another problem may also be posed by insufficient mechanical properties, for example insufficient rigidity, of the edge flange. The choice of materials for the inner part of the package should not excessively determine the materials for the edge flange.

However, it has been found in some cases the rigidity is still not satisfactory, e.g. it is especially pronounced when a snap lock is to be fastened to the rim. It has also been found that the injection moulding tool and injection valve system imposes limitations concerning the different kinds of rims that may be shaped.

SUMMARY OF THE INVENTION

Thus, it is an aim of the invention to present a package which allows the rim to be formed in a more versatile manner. Moreover, it is an aim of the invention to provide a package which may designed with a more rigid rim, e.g. for use in applications with snap-locks.

It is also an aim of the invention to present a method of forming a package of the above kind allowing the package to be designed and produced in a versatile manner, e.g. taking into account the desired rigidity in applications where the package is to receive a snap-lock.

It is also an aim of the invention to present a moulding tool by which a package may be formed.

Other advantages or problems solved will be apparent from the discussion below.

The above mentioned objects have been addressed by the provision of a package comprising a cardboard blank, the cardboard blank being shaped as a container with a bottom and one or more cardboard sidewalls extending upwardly from the bottom. The package further comprises a moulded rim being attached to said one or more cardboard sidewalls. The rim is attached along an interface formed of an upper portion of said one or more cardboard sidewalls and a lower portion of said moulded rim. The rim extends along at least a part of an upper edge of said one or more cardboard sidewalls. The package is characterised in that the rim is extending essentially upright upwardly from said one or more cardboard sidewalls thereby providing the package with a moulded upper sidewall portion.

In this way it is possible to produce a package which may be provided with an outwardly directed protrusion adapted to act as a ridge or peak for a snap-lock on the cover. Moreover, the rim will be comparably rigid against forces acting upwardly or downwardly making it easy to heat-seal or otherwise connect a cover to the upper surface of the rim. The package also makes it possible to use injection moulding where the injection point connects to a side surface of the rim. This in turn makes it possible to make the moulding tool design more compact. When the tool is provided with two cavities to form to packages side by side, the cavities need to be separated a distance such that the two flap cardboard blanks do not interfere with each other. This distance may be used to provide the space for the injection gates.

Upright extension is in its widest terms considered to encompass designs where the largest dimension of the rim extends at least more vertically than horizontally from the upper edge of the cardboard. It is preferred that the inside of the rim extends upwardly and most often slightly outwardly an angle δ relative a vertical direction, wherein the angle δ is between 0° and 30° and more preferably between 8° and 15°. It is preferred that the outside of the rim extends upwardly and most often slightly outwardly an angle γ relative a vertical direction, wherein the angle γ is between 0° and 45° and more preferably about 5°.

The rim may be provided with a protrusion extending outwardly from an outside of the rim and extending along at least a part of the rim in a circumferential direction, the protrusion being formed on one hand at a distance below an upper edge of the rim and on the other hand at a distance above the interface with said sidewalls.

In this way the protrusion may act as a member in a snap-lock keeping the cover or lid securely in place on the package. The protrusion may be divided into several portions each extending only along a portion of the circumferential direction of the rim. The protrusion may also be continuous and extend a complete lap around the mouth of the package. Such a protrusion may be used as a part of a sealing, separately or integrally as a member of a snap-lock.

The rim may be formed by injection moulding onto the cardboard blank with the injection point being located on an outside of the rim. By using injection moulding it is possible to shape relatively complicated shapes. It is also possible to use the injection moulding of the plastic material to securely attach the rim to the cardboard blank. By providing the injection point, the point where the plastic material is introduced into the mould cavity, on an outside of the rim, it is possible to provide the injection gate in a part of the moulding tool not provided with a number of other functionalities. This facilitates the design of the moulding tool. Moreover, in some cases it is advantageous that the injection point is located at a position of the package not being subject to any tough aesthetic or hygienic requirements. Moreover, by locating the injection point at the upright portion of the rim the size of the injection gate may be chosen without putting any strict demands on the geometry of the rim, i.e. the rim may be designed based on the demands on the package as such. In many cases the injection gates have a desired minimum size in the same order or even sometimes larger than the desired thickness of the rim.

The injection point may be located at a distance below said protrusion and at a distance above said interface. The protrusion is preferably located in the parting line in order to make the tool design simple. By providing the injection point between the protrusion and the interface between the cardboard and the injected plastic material it is possible to provide the injection gate in the part of the mould basically shaped as a bowl and not being provided with a number of other functionalities. This facilitates the design of the moulding tool. Moreover, the injection point will not interfere with any functionality of the snap-lock. Moreover, the injection point will in most applications be hidden by a sleeve of the lid.

The rim may be attached to the inside of the cardboard sidewall, and preferably only to the inside of the cardboard sidewall, and may extend upwardly from said one or more cardboard sidewalls thereby forming an outer side of the sidewall above the cardboard sidewall. By being located on the inside of the cardboard the plastic material in the rim provides automatically a seal between the cardboard edge and the stuff in the package. This is often advantageous since any moisture in the package, e.g. from food-stuff or the like, have a tendency to enter into the cardboard edge and soak the cardboard such that the cardboard loses its mechanical strength and looks less aesthetic. By providing the rim only on the inside of the cardboard, the cardboard edge will thereby form an aesthetic and visually distinct separation between the cardboard part of the package and the rim. Moreover, it is found easier to shape the packages in a consistent manner if the free edge of the cardboard is forced against a moulding tool wall compared to a situation where the cardboard edge is expected to extend into a cavity without having contact with any of the moulding tool walls. A free cardboard edge not leaning against any of the moulding tool walls have a tendency to be folded in one or the other direction by the injected plastic material thereby resulting in a non-consistent shaping of the packages.

The rim may essentially extend in the same general direction as the cardboard sidewall it is being attached to. Thereby it forms a strong extension of the cardboard part of the package.

The rim may extend along the upper edge of said one or more sidewalls and forms a continuous perimeter around the mouth of the container. In this way the rim may be used as a seal between the package and a lid.

The above mentioned objects have also been achieved by a method of forming a package, comprising the steps of:

shaping a cardboard blank into a container having a bottom and one or more sidewalls extending upwardly from the bottom, providing a moulding cavity into which an upper edge of said one or more sidewalls extends, the moulding cavity extending essentially upright from the sidewall having its upper edge extending into the cavity, moulding an essentially upright extending rim by injecting a plastic material into said cavity, the plastic material being injected at a first angle relative to a parting direction of the moulding tool forming the moulding cavity and also at a second angle relative to a parting line along which the mould bodies are separated from each other.

The advantages provided by the package formed also indirectly become advantages of the method.

By using injection moulding it is possible to shape relatively complicated shapes. It is also possible to use the injection moulding of the plastic material to securely attach the rim to the cardboard blank. By injecting the plastic material at a first angle relative to the parting direction of the moulding tool forming the moulding cavity and also at a second angle relative to a parting line, along which the mould bodies are separated from each other, it is possible to provide the injection gate in a part of the moulding tool not being used for a number of other functionalities. The injection of the plastic material may be provided from an outside of the finalised package. It may even be used to provide the injection of the plastic material in an area between an outward protrusion (for a snap-lock, seal or the like) and the cardboard part of the package.

The first angle is preferably between 30° and 90° most preferably it is about 45°. The second angle is preferably between 0° and 60° and most preferably it is about 45°. The lower limits of the first and second angles are determined by the minimum tool thickness between the injection gate and the outer perimeter of the tool body. The upper limit of the first angle is determined by the lower limit of the second angle and vice versa.

In most cases the parting line and the parting direction are perpendicular to each other.

The moulding cavity may be provided with a recess formed in the outside of the cavity and adapted to form a protrusion on the rim, the protrusion extending outwardly from an outside of the rim and extending along at least a part of the rim in a circumferential direction, the protrusion being formed on one hand at a distance below an upper edge of the rim and on the other hand at a distance above the interface with said sidewalls.

The protrusion may act as a member in a snap-lock keeping the cover or lid securely in place on the package. The protrusion may be divided into several portions each only extending along a portion of the circumferential direction of the rim. The protrusion may also be continuous and extend a complete lap around the mouth of the package. Such a protrusion may be used as a part of a sealing, separately or integrally as a member of a snap-lock.

The plastic material may be injected from an outside of the rim. By providing the injection point, the point where the plastic material is introduced into the mould cavity, on an outside of the rim, it is possible to provide the injection gate in a part of the moulding tool not provided with a number of other functionalities. This facilitates the design of the moulding tool. Moreover, it is advantageous that the injection point is located at a position of the package not being subject to any tough aesthetic or hygienic requirements.

The injection point may be located at a distance below said recess and at a distance above the upper edge of the cardboard extending into said cavity. The protrusion is preferably located in the parting line in order to make the tool design simple. By providing the injection point between the protrusion and the interface between the cardboard and the injected plastic material it is possible to provide the injection gate in the part of the mould basically shaped as a bowl and not being provided with a number of other functionalities. This facilitates the design of the moulding tool. Moreover, the injection point will not interfere with any functionality of the snap-lock. Moreover, the injection point will in most applications be hidden by a sleeve of the lid.

The upper edge of said one or more sidewalls may extend into said moulding cavity such that the plastic material will be injected and come into contact with the inside of the cardboard sidewall, and preferably only to the inside of the cardboard sidewall, and wherein the moulding cavity extends upwardly from said one or more cardboard sidewalls such that the rim will form an outer side of the package sidewall above the cardboard sidewall. By being located on the inside of the cardboard the plastic material in the rim provides automatically a seal between the cardboard edge and the stuff in the package. This is often advantageous since any moisture in the package, e.g. from food-stuff or the like, have a tendency to enter into the cardboard edge and soak the cardboard such that the cardboard loses its mechanical strength and looks less aesthetic. By providing the rim only on the inside of the cardboard, the cardboard edge will thereby form an aesthetic and visually distinct separation between the cardboard part of the package and the rim. Moreover, it is found easier to shape the packages in a consistent manner if the free edge of the cardboard is forced against a moulding tool wall compared to a situation where the cardboard edge is expected to extend into a cavity without having contact with any of the moulding tool walls. A free cardboard edge not leaning against any of the moulding tool walls have a tendency to be folded in one or the other direction by the injected plastic material thereby resulting in a non-consistent shaping of the packages.

The cavity my essentially extend in the same general direction as the sidewall having its upper edge extending into said cavity. Thereby it forms a strong extension of the cardboard part of the package.

The cavity may extend along the upper edge of said one or more sidewalls and forms a continuous cavity, such that the rim thus shaped will form a continuous perimeter around the mouth of the container. In this way the rim may be used as a seal between the package and a lid.

The above objects have also been achieved by the provision of a moulding tool for use in forming a package, the moulding tool comprising a first mould body and a second mould body, the first mould body being essentially bowl shaped and the second mould body being formed as a protrusion essentially conforming with the first mould body, the first and second mould bodies being adapted to together form a cavity for receiving and shaping a cardboard blank into a container having a bottom and one or more cardboard sidewalls extending upwardly from the bottom, the cavity being shaped such that they between them provides a widened cavity portion into which an upper edge of the cardboard sidewalls is adapted to extend, the widened moulding cavity extending essentially upright from the cardboard sidewall having its upper edge extending into the cavity, the widened cavity portion being connected to an injection gate, whereby a rim can be moulded onto said one or more cardboard sidewall by injecting a plastic material into said widened portion of the cavity, the plastic material being injected at an angle relative to a parting direction of the moulding tool forming the moulding cavity and also at an angle relative to a parting line along which the mould bodies are separated from each other.

The advantages provided by the package formed also indirectly become advantages of the moulding tool. Also advantages of the method used to form the package using the moulding tool indirectly become advantages of the moulding tool.

By using injection moulding it is possible to shape relatively complicated shapes. It is also possible to use the injection moulding of the plastic material to securely attach the rim to the cardboard blank. By injecting the plastic material at a first angle relative to the parting direction of the moulding tool forming the moulding cavity and also at a second angle relative to a parting line, along which the mould bodies are separated from each other, it is possible to provide the injection gate in a part of the moulding tool not being used for a number of other functionalities. The injection of the plastic material may be provided from an outside of the finalised package. It may even be used to provide the injection of the plastic material in an area between an outward protrusion (for a snap-lock, seal or the like) and the cardboard part of the package.

The first angle is preferably between 30° and 90° most preferably it is about 45°. The second angle is preferably between 0° and 60° and most preferably it is about 45°. The lower limits of the first and second angles are determined by the minimum tool thickness between the injection gate and the outer perimeter of the tool body. The upper limit of the first angle is determined by the lower limit of the second angle and vice versa.

BRIEF DESCRIPTION OF THE DRAWINGS

The invention will by way of example be described in more detail with reference to the appended schematic drawings, which shows presently preferred embodiments of the invention.

FIGS. 4a-e shows a package according to a first embodiment.

FIGS. 5a-d shows a package according to a second embodiment.

FIGS. 6a-e shows a package according to a third embodiment.

DETAILED DESCRIPTION OF PREFERRED EMBODIMENTS

Figure 1:
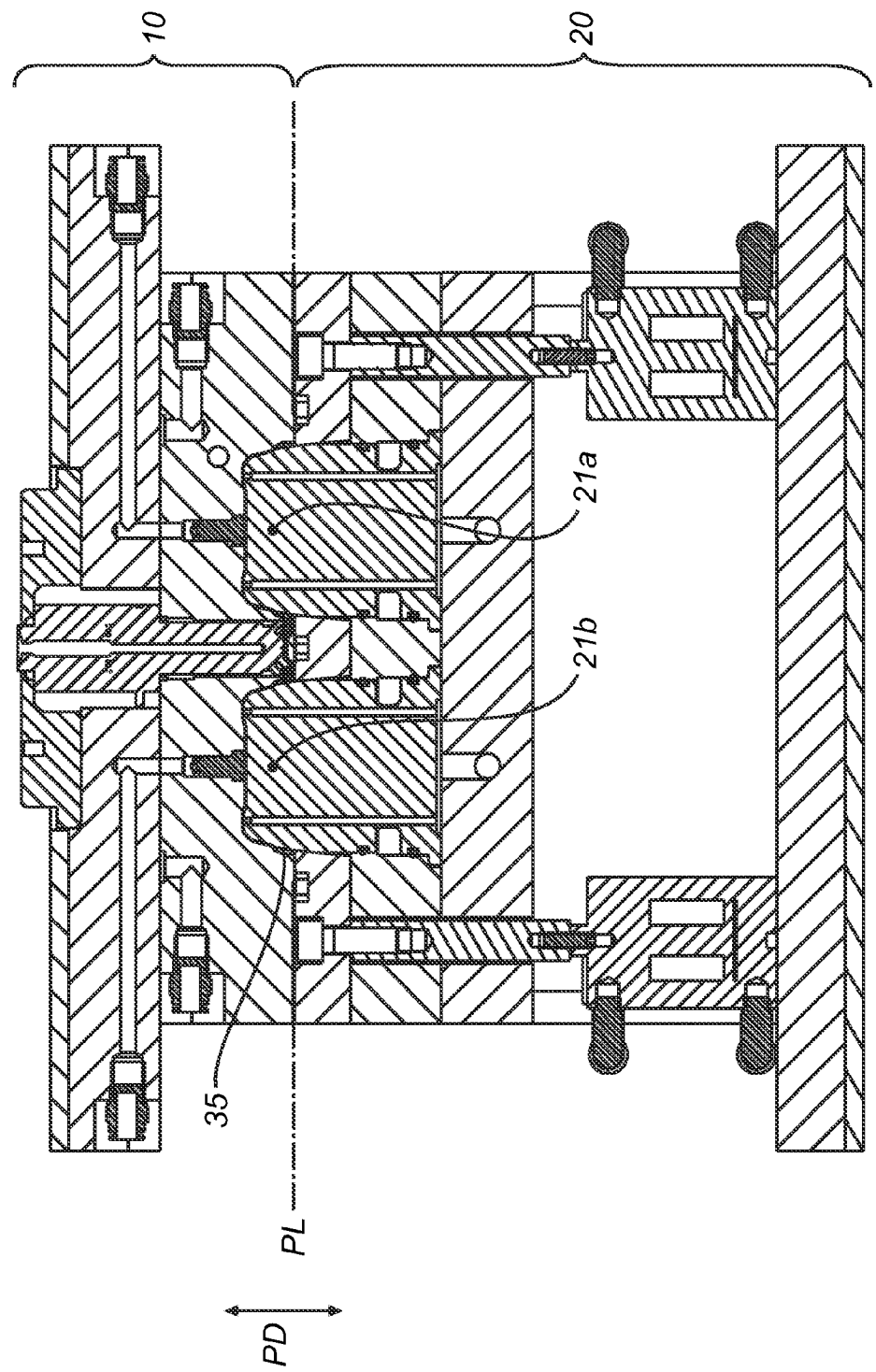
FIG. 1 shows a moulding tool in its closed position.
Figure 2:
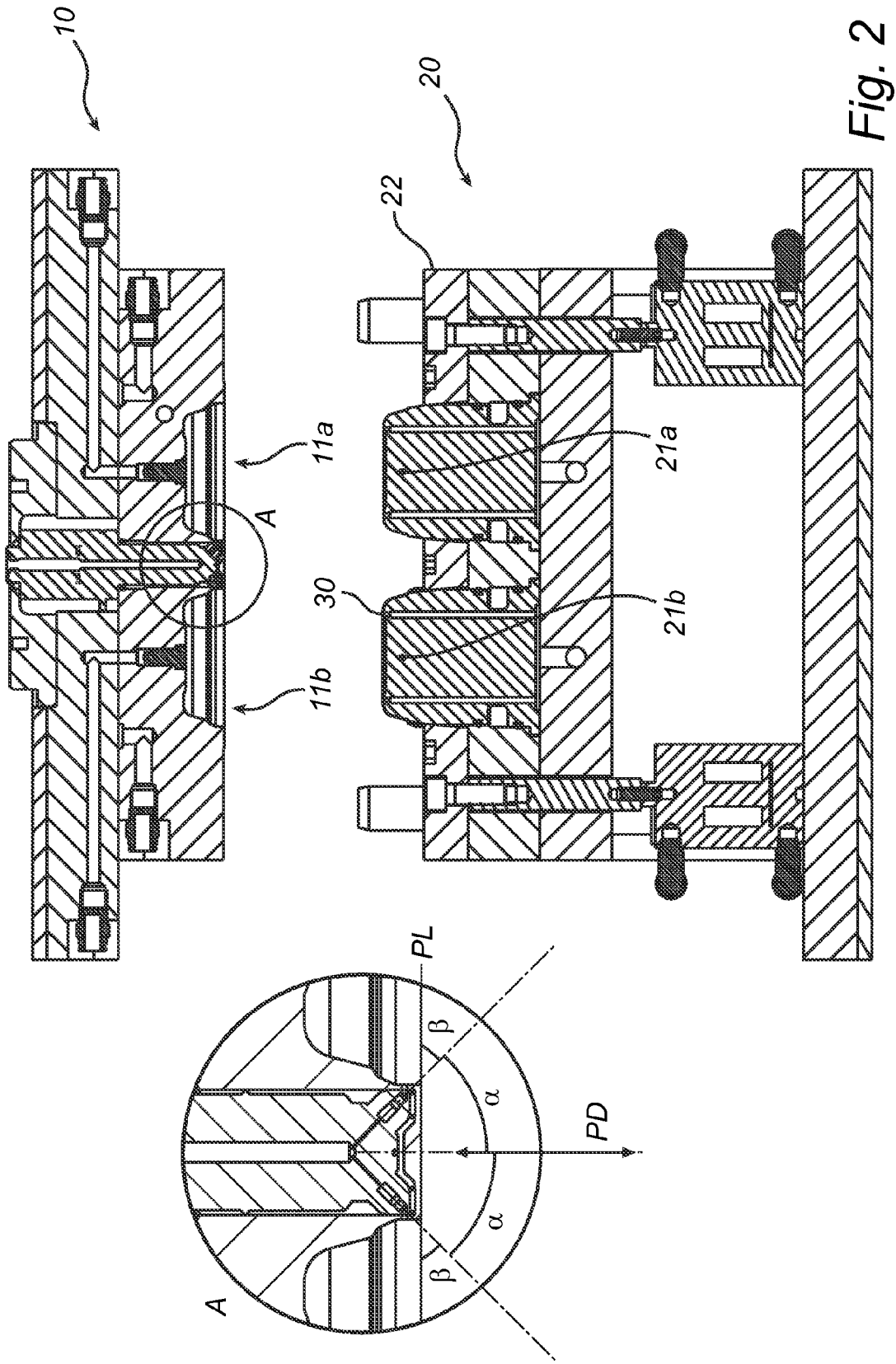
FIG. 2 shows the moulding tool of FIG. 1 in a position where the first tool half have been opened and where the moulded packages are still on the second mould half.
Figure 3:
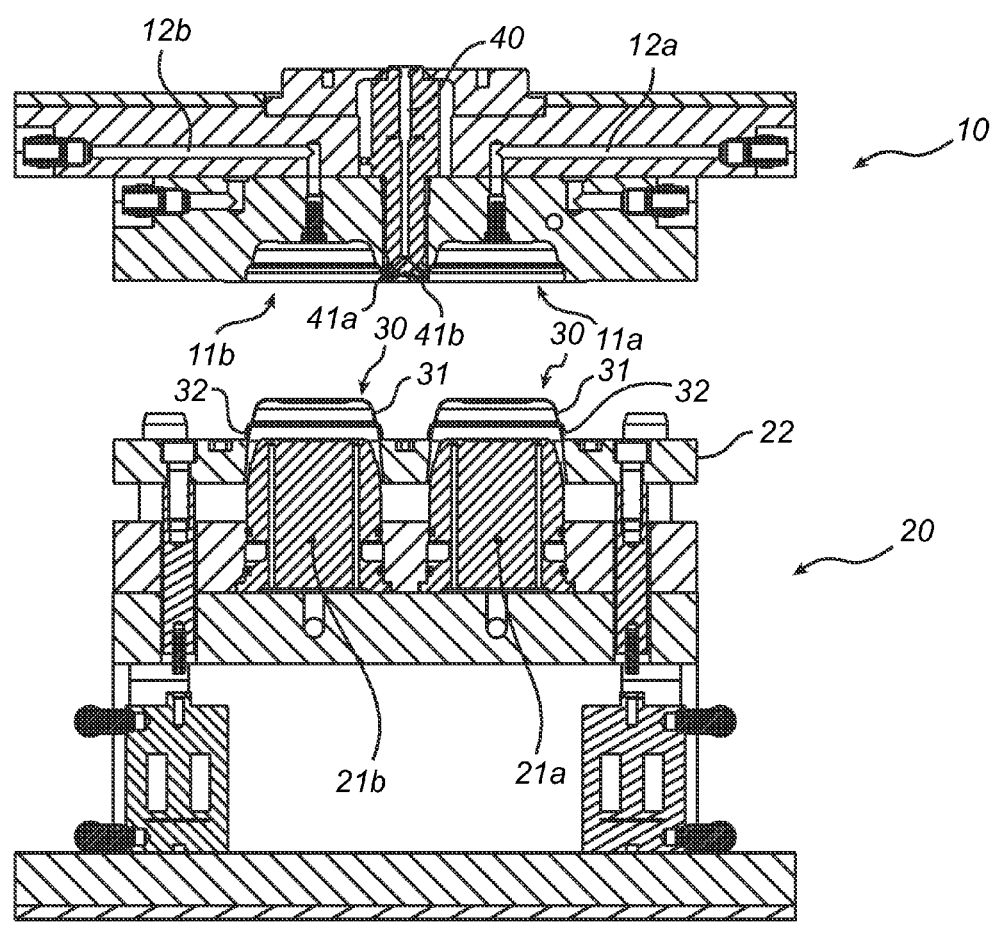
FIG. 3 shows the moulding tool of FIGS. 1 and 2 in a position where an ejector plate has removed a moulded packages from the second mould half.

FIG. 1 shows a cross-sectional view of a forming and moulding tool for forming a package. Basically the moulding tool comprises a first mould half or body 10 and a second mould half or body 20. The two mould halves 10 and 20 are separated from each other along a so-called partition line PL (indicated in FIG. 1). The two mould bodies 10 and 20 are separated from each other by being moved away from each other relative to each other along a parting direction PD (indicated in FIG. 1). The first mould body 10 is provided with two bowl shaped recesses 11a and 11b as is best shown in FIGS. 2 and 3. The second mould body 20 is provided with two protruding members 21a and 21b. A top portion (indicated by the location of reference numerals 21a and 21b in FIGS. 1 and 2) is adapted to extend into the respective recess of the first mould body 10. The protruding members 21a and 21b also extends into the second mould body 20 as indicated by the location of reference numerals 21a and 21b in FIG. 3). The top portions of the protruding members 21a and 21b form together with the recesses 11a and 11b two cavities in which a cardboard blank is adapted to be shaped into a container 31 and to be provided with a rim 32 and thereby form a package 30.

It should be noted that in the description top and bottom of the mould refers to the orientation of the mould as shown in FIGS. 1-3. It is possible to arrange the mould in other directions such as having a vertical parting line or having an inclined parting line. It is also possible to have the mould halves arranged in the opposite direction with the first mould body below the second mould body.

A package is basically manufactured according to the following. A flat cardboard blank is placed in between the open mould halves 10 and 20. As the mould is closed, i.e. the mould halves 10 and 20 are brought closer to each other, the protruding members 21a and 21b will push the cardboard blank into the recesses 11a and 11b thereby shaping the flat cardboard blank into a container 31 having a bottom 31a and one or more sidewalls 31b extending upwardly from the bottom 31a.

For a circular or ellipsoid or otherwise similarly shaped container 31 it may be considered common to speak of one sidewall. For a rectangular or otherwise similarly shaped container it may be considered common to speak of more than one sidewall (e.g. four sidewalls in case of a rectangular container and three in case of a triangular container). It should be noted that said plurality of sidewalls are still preferably integrally formed of a single cardboard blank and the junction between the sidewalls are thereby formed as a continuous but sharply bent or folded portion of the cardboard blank. In one sense such a container may also be said to have a single sidewall, with this single sidewall being formed of four comparably straight portions and four curved portions or corner portions.

The recesses 11a and 11b and the protruding members 21a and 21b are shaped such that when the mould is closed there is a space just sufficiently wide to allow the cardboard blank to be accommodated between them. The level of pressure exerted onto the cardboard will be dependent upon the choice of cardboard material, the choice of shape of the container, etc. Such parameters are well known to a person skilled in the art and will not be described in any detail.

In the lower most portions of the recesses 11a and 11b, i.e. the portion corresponding to the top portion of the sidewall 31b of the container 31, the recesses 11a and 11b and the protruding members 21a and 21b are designed such that a cavity 35 is formed. The cavity 35 extends completely around the perimeter of the recesses 11a and 11b. The cavity 35 is adapted to be filled with molten plastic using a so-called injection moulding operation. Plastic material which is heated such that it is mouldable is injected under pressure into the cavity 35 and will fill every part of the cavity 35. The plastic material will thereby assume the same shape as defined by the cavity 35. The plastic material is then cooled such that it solidifies in the shape defined by the cavity 35.

After the molten plastic material has solidified in the cavity 35, the mould can be opened to the open position again. In a first step the second mould body 20 is moved away from the first mould body 10, which in this embodiment is stationary. To secure that the packages 30 will not stick to the first mould body 10 but stay on the protruding members 21a and 21b as the second mould body is moved away from the first mould body 10, air under pressure may be supplied to the recesses 11a and 11b via air ducts 12a and 12b in the first mould body 10. At this initial opening step the ejector plate 22 is in the rear position. This is shown in FIG. 2.

In the next step the ejector plate 22 is moved to the front position (as shown in FIG. 3). In this movement, the ejector plate 22 removes the finished packages 30 from the protruding members 21a and 21b. The packages 30 are now free to be removed by a robot or the like.

A new cardboard blank is placed between the mould halves which are closed to shape the cardboard, the plastic material is injected into the cavity 35 and the mould halves are then opened again according to the description above.

The plastic material is injected to the cavities 35 using a hot runner 40 which ends into two gates 41a and 41b. The hot runner 40 is located centrally in the first mould body 10 between the two recesses 11 and 11b. The two gates 41a and 41b extend from the hot runner 40 to the cavities 35. Thus, the gates 41a and 41b connect to the cavities 35 such that as viewed from the package 30, the plastic material will be injected from an outside of the rim. The gates 41a and 41b are angled a first angle α relative to a parting direction PD and a second angle β relative to a parting line PL along which the mould bodies are separated from each other. The angles α and β are indicated in the enlargement shown in FIG. 2b. In the preferred embodiment shown in FIGS. 1-3, the parting line PL and the parting direction PD are perpendicular. The angles α and β are both 45°.

Suitable moulding materials include various thermoplastics which are melt processable; in other words, they can be supplied in molten state into the mould cavity, in which they solidify and attach directly to the cardboard or to a plastic coating of the cardboard, forming simultaneously a rigid rim. Suitable polymers, on which these plastics are based, include polyolefins, polyesters and polyamides. Environmentally friendly moulding materials include biodegradable plastics, such as any of the following: polylactide (PLA), biodegradable polyester, starch-based plastics or polyhydroxy alkanoate, particularly PHB. In this way, the recyclability of the package can be improved as a whole, even though it has been made partly by injection moulding. The above-mentioned biodegradable plastics may also be used as materials for coating the cardboard blank.

The plastic material provided through the gates is allowed to solidify and thereby temporarily close the gates between the injection cycles.

In FIGS. 4-6, there different packages are disclosed.

Figure 4E:
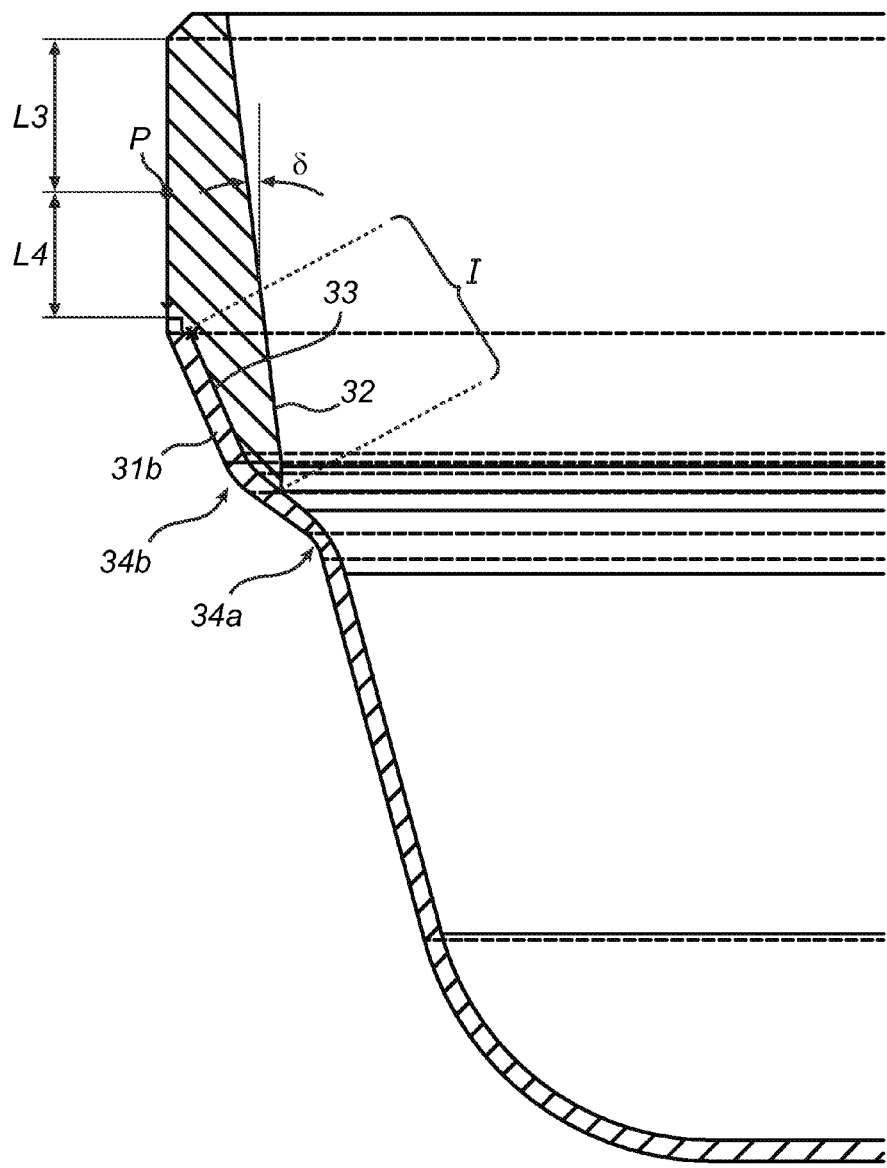

FIGS. 4a-e, discloses a circular package 30 comprising a circular bottom 31a and a sidewall 31b integrally formed with the bottom 31a and extending upwardly from the bottom 31a. The package further comprises a moulded rim 32 being attached to the cardboard sidewall 31b. As is shown in the enlargement of FIG. 4e, the moulded rim 32 and the sidewall 31b are attached to each other along an interface at the upper portion of the sidewall 31b and a lower portion of the rim 32. The rim 32 extends fully along the circular sidewall 31b and forms a continuous rim 32 completely encircling the mouth of the thus shaped package 30. As is shown in e.g. FIGS. 4a, 4d and 4e, the rim 32 extends upright upwardly from the sidewall 31b. The outer surface of the rim extends vertically upwardly. The inner surface of the rim has a slight inclination outwardly upwardly. This results in that the largest dimension of the rim has a slight inclination outwardly upwardly. The rim 32 forms a moulded upper sidewall portion.

The cardboard sidewall 31b is provided with two curves 34a and 34b, the lower just below the interface and the upper in the lower portion of the interface. These two curves aids in keeping the upper edge of the cardboard sidewall 31b against the recesses 11a and 11b of the first mould body 10.

FIGS. 5a-5d shows an ellipsoid package 30 comprising an ellipsoid bottom 31a and a sidewall 31b integrally formed with the bottom 31a and extending upwardly from the bottom 31a. The package 30 is also provided with a rim 32 as discussed in more detail in reference to FIGS. 4a-e.

FIGS. 6a-d discloses a rectangular package 30 having a rectangular bottom 31a and four sidewalls 31b integrally formed with the bottom 31a. As is shown in FIGS. 6a-d, the four sidewalls 31b are in fact formed as a single continuous sidewall 31b with curved corner portions and straight portions between the corners. A similarly shaped rectangular package may also be provided using a folding operation at the corners. The sidewalls 31b are provided with a rim 32 as discussed in more detail in reference to FIGS. 4a-e.

The rims 32 in FIGS. 5a-d and FIGS. 6a-d are provided with a protrusion extending outwardly from an outside of the rim. The protrusion 36 extends as a continuous ridge or peak in the circumferential direction around the rim 32. The protrusion 36 is located a distance L1 below the upper edge of the rim and a distance L2 above the interface (i.e. above the edge of the cardboard sidewall 31b).

The minimum distance L1 is determined by the rigidity that the protrusion need to have. To perform as a part of a snap-lock the protrusion may e.g. have a height of 2-3 mm, i.e. the distance L1 should be 2-3 mm. In other applications it may suffice with a protrusion being 0.5 mm or the like in height, i.e. the distance L1 should in such a case be 0.5 mm. Thus the distance L1 should be more than 0.5 mm.

The minimum distance L2 is amongst others determined by the space required for the injection gate. The distance L2 should be more than 3 mm and preferably about 5 mm.

The minimum height of the rim 32 is about 5 mm taking into consideration that there should be sufficient space for the injection gate and for the protrusion.

The injection point P is located at a distance L3 below said protrusion 36 (a distance L3 below the top of the rim 32 if there is no protrusion) and at a distance L4 above said interface I. The distance L3 is more than 2 mm to allow the injection gates 41a-b to be formed in the mould body 10. The distance L4 is more than 2 mm to secure that the flow of plastic material injected does not pull the upper edge of the cardboard sidewall 31b from its abutment to the mould cavity 35.

When the package 30 is provided with a protrusion as in FIGS. 5a-d and FIGS. 6a-e, the parting line PL will be at the widest portion of the protrusion. Thus, the portion of the rim 32 being located above the parting line PL will be formed by a part of the cavity 35 being shaped as cavity portion in the second mould body 20.

As shown in the enlargements of FIGS. 4e, 5d and 6e, the rim 32 is attached to the inside of the cardboard sidewall 31b. The cardboard sidewall 31b forms the lower part of the outer side and the rim forms an upper part of the outer side of the sidewall above the cardboard sidewall. In the embodiments of FIGS. 4-6, the rim 32 essentially extends in the same general direction as the cardboard sidewall 31b it is being attached to.

The lid may be made of any material. The lid is may be made of cardboard whose lower surface has been coated with a material that is compatible with the material of the rim, for example for sealing the lid tightly and/or for allowing reclosability. The lid may also be a plastic film comprising one or more layers and sealed to the upper surface of the rim. Such a film may be transparent so that the content of the package can be viewed without opening the package. It is also possible that the lid, irrespective of its material, is attached to the rim mechanically only using the protrusion on the rim as a part of a snap-lock. It may also be combinations thereof, e.g. a sealable lid providing a sealed container or providing tamper evidence wherein the lid is also provided with a snap-on functionality providing a mechanical protection to the seal and providing a recloseable package. Alternatively one may use two separate lids; one sealed and one snap-on.

FIGS. 6a-e shows a design where a lid 50 with a central portion 51 of a cardboard material is provided with an injection moulded edge rim 52. The edge rim 52 of the lid 50 extends vertically downwardly on the outside of the rim 32 of the package 30. The edge rim 52 is provided with an inwardly extending protrusion 53. This protrusion 53 is adapted to co-operate with the protrusion 36 of the rim 32 of the package 30, thereby forming a snap-lock securely but removably and recloseably keeping the lid 50 on the package 30.

Even if the above-described package is particularly well suited for packaging of food in a tight manner, it is also suitable for products other than food, in which case it is possible to select the material for moulding the rim by taking into account factors other than the air-tight closure required for food.

It is contemplated that there are numerous modifications of the embodiments described herein, which are still within the scope of the invention as defined by the appended claims.

The previously mentioned plurality of sidewalls may for instance also in accordance with another embodiment be formed of pieces of cardboard where there is no continuous connection between two adjacent sidewalls. The sidewalls may e.g. in case of a rectangular container be formed of four flaps integrally formed with the bottom portion and extending basically outwardly from respective side of the rectangular bottom portion. As they are folded upwardly the free edges of one of the flaps will come close to the free edges of the adjacent flaps. Such a container may also be provided with the rim according to the invention. The gaps between the adjacent flaps may be closed by use of the injection moulding step. The gaps may alternatively be left open.

The shape of the package may also be different from that described above. For example, there may be compartment shapes in the bottom part of the container.

As alternatives to the design with one hot runner and two gates it is conceivable to e.g. use a design where one package is formed at the time where the mould is provided with one hot runner and one injection gate. It is also conceivable to have two separate hot runners each leading to one gate for one product. This may be advantageous when large blanks are used to form deep trays or packages. In such a case the blanks will overlap each other and it is desirable to separate the mould cavities from each other. However, there is often a limited acceptable distance between two injection gates connected to the same hot runner. Thereby it may in some cases be advantageous to use two separate hot runners.

The invention claimed is:

1. A method of forming a package, comprising the steps of:
   shaping a cardboard blank into a container having a bottom and one or more sidewalls extending upwardly from the bottom,
   providing a moulding cavity into which an upper edge of said one or more sidewalls extends, the moulding cavity extending essentially upright from the sidewall having its upper edge extending into the cavity,
   moulding an essentially upright extending rim by injecting a plastic material into said cavity from outside of the rim, wherein the upper edge of said one or more sidewalls extends into said moulding cavity such that the plastic material will be injected and come into contact with the inside of the cardboard sidewall, and wherein the moulding cavity extends upwardly from said one or more cardboard sidewalls such that the rim will form an outer side of the package sidewall above the cardboard sidewall,
   the plastic material being injected at a first angle relative to a parting direction of the moulding tool forming the moulding cavity and also at a second angle relative to a parting line along which the mould bodies are separated from each other.

2. A method according to claim 1, wherein the moulding cavity is provided with a recess formed in the outside of the cavity and adapted to form a protrusion on the rim, the protrusion extending outwardly from an outside of the rim and extending along at least a part of the rim in a circumferential direction, the protrusion being formed on one hand at a first distance below an upper edge of the rim and on the other hand at a second distance above the interface with said sidewalls.

3. A method according to claim 2 wherein an injection point is located at a third distance below said recess and at a fourth distance above the upper edge of the cardboard extending into said cavity.

4. A method according to claim 1, wherein the cavity essentially extends in the same general direction as the sidewall having its upper edge extending into said cavity.

5. A method according to claim 1, wherein the cavity extends along the upper edge of said one or more sidewalls and forms a continuous cavity, such that the rim thus shaped will form a continuous perimeter around a mouth of the container.

6. A method according to claim 1 wherein the plastic will be injected and come into contact only to the inside of the cardboard sidewall.

7. A method of forming a package, comprising the steps of:
   shaping a cardboard blank into a container having a bottom and one or more sidewalls extending upwardly from the bottom,
   providing a moulding cavity into which an upper edge of said one or more sidewalls extends, the moulding cavity extending essentially upright from the sidewall having its upper edge extending into the cavity, a wall of the moulding cavity extending upwardly from said one or more cardboard sidewalls,
   injecting a plastic material into the moulding cavity at a point above the upper edge of the sidewall, the plastic material contacting the inside of the cardboard sidewall to mould an essentially upright extending rim, the rim forming an outer side of the package sidewall above the cardboard sidewall,
   the plastic material being injected at a first angle relative to a parting direction of the moulding tool forming the moulding cavity and also at a second angle relative to a parting line along which the mould bodies are separated from each other.

8. A method according to claim 7, wherein the moulding cavity is provided with a recess formed in the outside of the moulding cavity and adapted to form a protrusion on the rim, the protrusion extending outwardly from an outside of the rim and extending along at least a part of the rim in a circumferential direction, the protrusion being formed at a first distance below an upper edge of the rim and at a second distance above an interface with said sidewalls.

9. A method according to claim 8 wherein an injection point is located at a third distance below the recess and at a fourth distance above the upper edge of the cardboard extending into the moulding cavity.

10. A method according to claim 7, wherein the plastic material is injected from outside the rim.

11. A method according to claim 7, wherein the moulding cavity essentially extends in the same general direction as the sidewall having its upper edge extending into said cavity.

12. A method according to claim 7, wherein the moulding cavity extends along the upper edge of said one or more sidewalls and forms a continuous cavity, such that the rim thus shaped will form a continuous perimeter around a mouth of the container.

* * * * *